United States Patent
Hsu et al.

(10) Patent No.: US 10,921,785 B2
(45) Date of Patent: Feb. 16, 2021

(54) SYSTEMS AND METHODS FOR THERMAL CONTROL OF INFORMATION HANDLING RESOURCES BASED ON USER PROXIMITY

(71) Applicant: Dell Products L.P., Round Rock, TX (US)

(72) Inventors: Claire H. Hsu, Austin, TX (US); Travis C. North, Cedar Park, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 16/415,999

(22) Filed: May 17, 2019

(65) Prior Publication Data
US 2020/0363786 A1 Nov. 19, 2020

(51) Int. Cl.
G05B 19/4155 (2006.01)
G06F 1/20 (2006.01)

(52) U.S. Cl.
CPC ........... *G05B 19/4155* (2013.01); *G06F 1/20* (2013.01); *G06F 1/206* (2013.01); *G05B 2219/49219* (2013.01)

(58) Field of Classification Search
CPC .................. G05B 19/4155; G05B 2219/49219
USPC ......................................................... 700/300
See application file for complete search history.

(56) References Cited

U.S. PATENT DOCUMENTS

| | | | |
|---|---|---|---|
| 2007/0027580 A1* | 2/2007 | Ligtenberg | G06F 1/206 700/300 |
| 2008/0042603 A1* | 2/2008 | Chen | H05K 7/20209 318/109 |
| 2016/0282929 A1* | 9/2016 | Dutta | G06F 1/3212 |

* cited by examiner

*Primary Examiner* — Jigneshkumar C Patel
(74) *Attorney, Agent, or Firm* — Jackson Walker L.L.P.

(57) ABSTRACT

An information handling system may include a processor, a proximity sensor configured to determine whether a user of the information handling system is proximate to the information handling system, an air mover configured to cause movement of gaseous fluid within the information handling system in order to thermally cool one or more components of the information handling system, and an air mover control system configured to receive a signal from the proximity sensor indicative of whether the user is proximate to the information handling system and control a speed of a motor of the air mover based on whether the user is proximate to the information handling system.

7 Claims, 2 Drawing Sheets

SYSTEMS AND METHODS FOR THERMAL CONTROL OF INFORMATION HANDLING RESOURCES BASED ON USER PROXIMITY

TECHNICAL FIELD

The present disclosure relates in general to information handling systems, and more particularly to systems and methods for providing thermal control based on user proximity in information handling systems.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

As processors, graphics cards, random access memory (RAM) and other components in information handling systems have increased in clock speed and power consumption, the amount of heat produced by such components as a side-effect of normal operation has also increased. Often, the temperatures of these components need to be kept within a reasonable range to prevent overheating, instability, malfunction and damage leading to a shortened component lifespan. Accordingly, air movers (e.g., cooling fans and blowers) have often been used in information handling systems to cool information handling systems and their components.

One disadvantage of existing approaches to thermal control of information handling systems is that oftentimes, air movers generate undesired acoustic noise that may be offensive to a user of the information handling system. Existing approaches to thermal control of information handling systems may not effectively minimize undesirable acoustic noise while providing sufficient cooling of resources of an information handling system

SUMMARY

In accordance with the teachings of the present disclosure, the disadvantages and problems associated with thermal control in information handling systems may be substantially reduced or eliminated.

In accordance with embodiments of the present disclosure, an information handling system may include a processor, a proximity sensor configured to determine whether a user of the information handling system is proximate to the information handling system, an air mover configured to cause movement of gaseous fluid within the information handling system in order to thermally cool one or more components of the information handling system, and an air mover control system configured to receive a signal from the proximity sensor indicative of whether the user is proximate to the information handling system and control a speed of a motor of the air mover based on whether the user is proximate to the information handling system.

In accordance with these and other embodiments of the present disclosure, a method may include receiving a signal from a proximity sensor indicative of whether a user is proximate to an information handling system and controlling a speed of a motor of an air mover of the information handling system based on whether the user is proximate to the information handling system.

In accordance with these and other embodiments of the present disclosure, an article of manufacture comprising a non-transitory computer readable medium and computer-executable instructions carried on the computer readable medium, the instructions readable by a processor, the instructions, when read and executed, for causing the processor to receive a signal from a proximity sensor indicative of whether a user is proximate to an information handling system and control a speed of a motor of an air mover of the information handling system based on whether the user is proximate to the information handling system.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
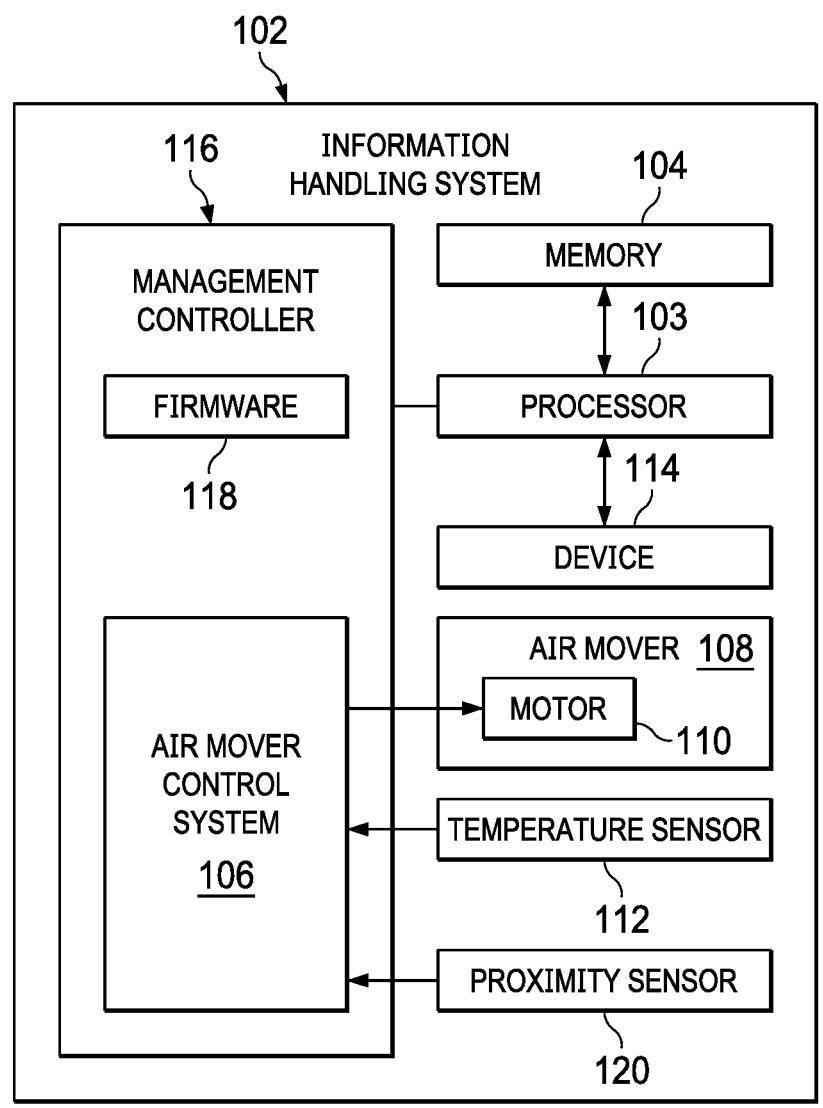
FIG. 1 illustrates a block diagram of an example information handling system, in accordance with embodiments of the present disclosure.
Figure 2:
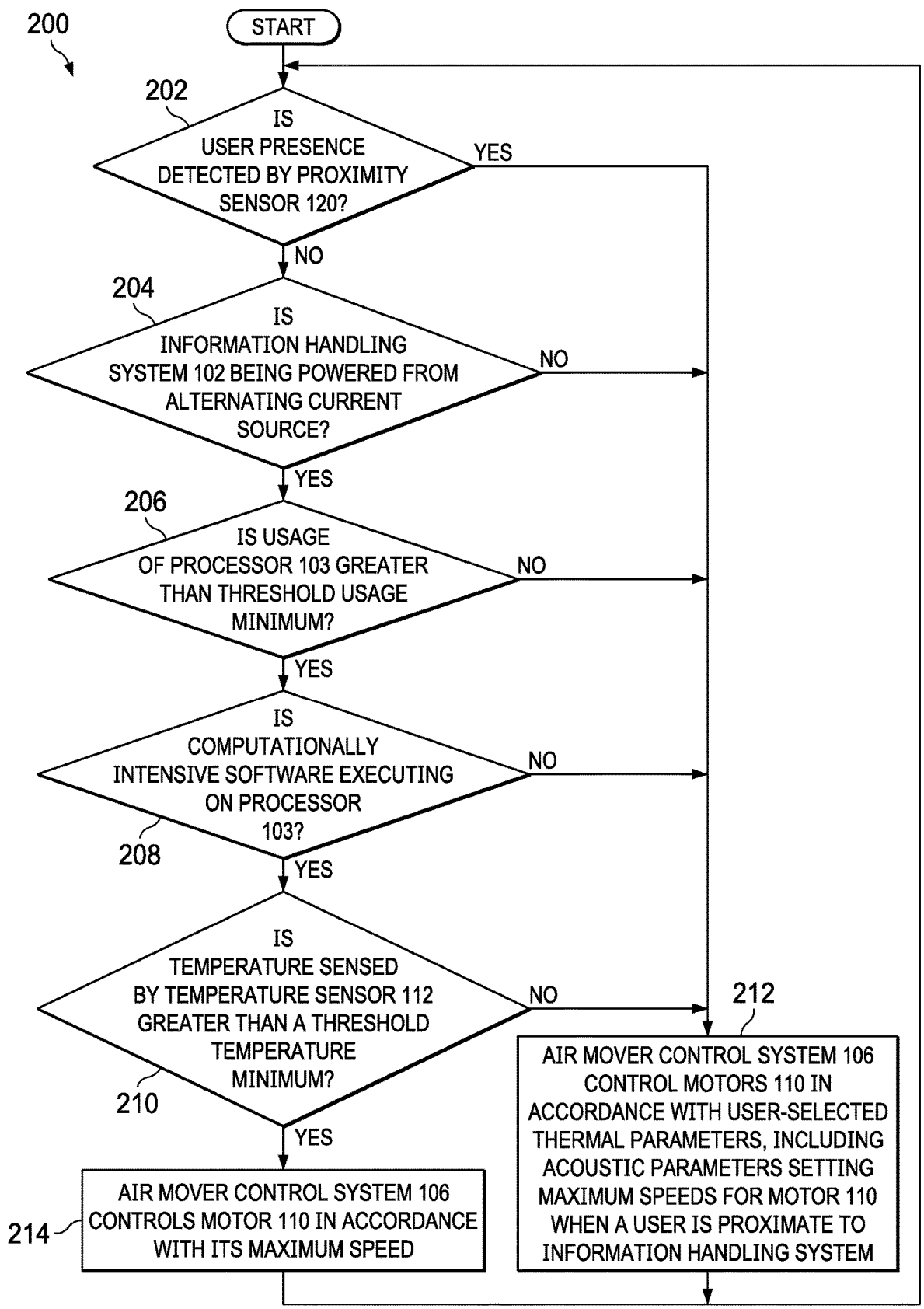
FIG. 2 illustrates a flow chart of an example method for providing thermal control of information handling resources based on user proximity, in accordance with embodiments of the present disclosure.

Preferred embodiments and their advantages are best understood by reference to FIGS. 1 and 2, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network storage device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, buses, memories, I/O devices and/or interfaces, storage resources, network interfaces, motherboards, integrated circuit packages; electro-mechanical devices (e.g., air movers), displays, and power supplies.

FIG. 1 illustrates a block diagram of an example information handling system 102, in accordance with the present disclosure. In some embodiments, information handling system 102 may comprise a server chassis configured to house a plurality of servers or "blades." In other embodiments, information handling system 102 may comprise a personal computer (e.g., a desktop computer, laptop computer, mobile computer, and/or notebook computer). In yet other embodiments, information handling system 102 may comprise a storage enclosure configured to house a plurality of physical disk drives and/or other computer-readable media for storing data. As shown in FIG. 1, an information handling system 102 may comprise a processor 103, a memory 104 communicatively coupled to processor 103, an air mover 108 communicatively coupled to an air mover control system 106 (e.g., which may be implemented by a management controller 116), a temperature sensor 112 communicatively coupled to air mover control system 106, one or more devices 114 communicatively coupled to processor 103, a proximity sensor 120, and a management controller 116 communicatively coupled to processor 103.

Processor 103 may comprise any system, device, or apparatus operable to interpret and/or execute program instructions and/or process data, and may include, without limitation a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104 and/or another component of information handling system 102.

Memory 104 may be communicatively coupled to processor 103 and may comprise any system, device, or apparatus operable to retain program instructions or data for a period of time. Memory 104 may comprise random access memory (RAM), electrically erasable programmable read-only memory (EEPROM), a PCMCIA card, flash memory, magnetic storage, opto-magnetic storage, or any suitable selection and/or array of volatile or non-volatile memory that retains data after power to information handling system 102 is turned off.

Air mover 108 may be communicatively coupled to air mover control system 106, and may include any mechanical or electro-mechanical system, apparatus, or device operable to move air and/or other gases. In some embodiments, air mover 108 may comprise a fan (e.g., a rotating arrangement of vanes or blades which act on the air). In other embodiments, air mover 108 may comprise a blower (e.g., a centrifugal fan that employs rotating impellers to accelerate air received at its intake and change the direction of the airflow). In these and other embodiments, rotating and other moving components of air mover 108 may be driven by a motor 110. The rotational speed of motor 110 may be controlled by the air mover control signal communicated from air mover control system 106. In operation, air mover 108 may cool information handling resources of information handling system 102 by drawing cool air into an enclosure housing the information handling resources from outside the chassis, expel warm air from inside the enclosure to the outside of such enclosure, and/or move air across one or more heatsinks (not explicitly shown) internal to the enclosure to cool one or more information handling resources.

A temperature sensor 112 may be any system, device, or apparatus (e.g., a thermometer, thermistor, etc.) configured to communicate a signal to air mover control system 106 indicative of a temperature within information handling system 102.

Proximity sensor 120 may comprise any system, device, or apparatus configured to detect the presence of a user at or near information handling system 102 and communicate a signal to air mover control system 106 indicative of a presence or absence of a user proximate to information handling system 102. While the implementation of proximity sensor 120 is beyond the scope of this disclosure, proximity sensor 120 may be implemented in any suitable manner, including, without limitation, one or more of the following:

detection of user interaction with a keyboard, mouse, and/or other input/output device of information handling system 102;

visual detection of presence or absence of a user with a camera, motion detector, and/or other photosensor of information handling system 102;

a vibrational sensor or other mechanical sensor (e.g., a gyroscope, accelerometer, etc.) that detects movement of a user (e.g., vibration associated with user typing and/or user breathing); and/or a microphone and/or other acoustical transducer configured to detect sound of a user or otherwise indicative of a user.

For ease of exposition, FIG. 1 depicts only one each of air mover control system 106, air mover 108, temperature sensor 112, and proximity sensor 120. However, it is noted that information handling system 102 may include two or more air movers 108 and each such air mover 108 may have a dedicated respective air mover control system 106. It is further noted that an air mover control system 106 may receive temperature signals from one or more temperature sensors 112, and that a single temperature sensor 112 may communicate temperature signals to one or more air mover control systems 106. It is additionally noted that information handling system 102 may include two or more proximity sensors for detecting user presence.

Device 114 may be communicatively coupled to processor 103 and may generally include any information handling resource.

Management controller 116 may be configured to provide out-of-band management facilities for management of information handling system 102. Such management may be made by management controller 116 even if information handling system 102 is powered off or powered to a standby state. Management controller 116 may include a processor, memory, out-of-band network interface separate from and physically isolated from an in-band network interface of information handling system 102, and/or other embedded information handling resources. In certain embodiments, management controller 116 may include or may be an integral part of a baseboard management controller (BMC) or a remote access controller (e.g., a Dell Remote Access Controller or Integrated Dell Remote Access Controller). In other embodiments, management controller 116 may include or may be an integral part of a chassis management controller (CMC).

As shown in FIG. 1, management controller 116 may include firmware 118 and air mover control system 106. Firmware 118 may include a program of executable instructions configured to be read and executed by management controller 118 in order to carry out the functionality of management controller 118, including that functionality described herein.

Air mover control system 106 may include any system, device, or apparatus configured to receive one or more signals indicative of one or more temperatures within information handling system 102 (e.g., one or more signals from one or more temperature sensors 112) and receive one or more signals indicative of user proximity to information handling system 102 (e.g., one or more signals from one or more proximity sensors 120), and based on such signals, determine an air mover driving signal to maintain an appropriate level of cooling, increase cooling, or decrease cooling, as appropriate, and communicate such air mover driving signal to air mover 108. Although FIG. 1 depicts air mover control system 106 integral to management controller 116, in some embodiments, air mover control system 106 may be external to and independent from management controller 116. In addition, although FIG. 1 depicts air mover control system 106 independent from firmware 118, in some embodiments, air mover control system 106 may be implemented within firmware 118.

FIG. 2 illustrates a flow chart of an example method 200 for providing thermal control of information handling resources based on user proximity, in accordance with embodiments of the present disclosure. According to certain embodiments, method 200 may begin at step 202. As noted above, teachings of the present disclosure may be implemented in a variety of configurations of information handling system 102. As such, the preferred initialization point for method 200 and the order of the steps comprising method 200 may depend on the implementation chosen. In these and other embodiments, method 200 may be implemented as firmware, software, applications, functions, libraries, or other instructions.

At step 202, air mover control system 106 may determine if user presence is detected by proximity sensor 120. If user presence is detected, method 200 may proceed to step 212. Otherwise, if user presence is not detected, method 200 may proceed to step 204.

At step 204, air mover control system 106 may determine if information handling system 102 is being powered from an alternating current source or a battery. If information handling system 102 is being powered from a battery, method 200 may proceed to step 212. Otherwise, if information handling system 102 is being powered from an alternating current source, method 200 may proceed to step 206.

At step 206, air mover control system 106 may determine if usage of processor 103 is greater than a threshold usage minimum (e.g., 40% of maximum capacity). If usage of processor 103 is lesser than the threshold usage minimum, method 200 may proceed to step 212. Otherwise, if usage of processor 103 is greater than the threshold usage minimum, method 200 may proceed to step 208.

At step 208, air mover control system 106 may determine if computationally intensive software is executing on processor 103. If computationally intensive software is not executing on processor 103, method 200 may proceed to step 212. Otherwise, if computationally intensive software is executing on processor 103, method 200 may proceed to step 210.

At step 210, air mover control system 106 may determine if a temperature sensed by temperature sensor 112 is greater than a threshold temperature minimum. If temperature sensed by temperature sensor 112 is greater than the threshold temperature minimum, method 200 may proceed to step 212. Otherwise, if a temperature sensed by temperature sensor 112 is greater than the threshold temperature minimum, method 200 may proceed to step 214.

At step 212, air mover control system 106 may control motor 110 in accordance with user-selected thermal parameters, which may include acoustic parameters setting maximum speeds for motor 110 when a user is proximate to information handling system 102. After completion of step 212, method 200 may proceed again to step 202.

At step 214, air mover control system 106 may control motor 110 in accordance with its maximum speed. After completion of step 214, method 200 may proceed again to step 202.

Although FIG. 2 discloses a particular number of steps to be taken with respect to method 200, method 200 may be executed with greater or fewer steps than those depicted in FIG. 2. In addition, although FIG. 2 discloses a certain order of steps to be taken with respect to method 200, the steps comprising method 200 may be completed in any suitable order. For example, while method 200 would appear to require the satisfaction of a particular condition at each of steps 202 through 210 in order to reach step 214, in some embodiments, fewer particular conditions may be required (e.g., in some embodiments, step 208 may not be present and step 206 may flow directly to step 210 if computationally intensive software is executing on processor 103). In yet other embodiments, one or more particular conditions other than those contemplated in steps 202 through 210 may be used in lieu of or in addition to one or more of the particular conditions of steps 202 through 210.

Method 200 may be implemented using a management controller 116, components thereof or any other system operable to implement method 200. In certain embodiments, method 200 may be implemented partially or fully in software and/or firmware embodied in computer-readable media.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Accordingly, modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described above.

Unless otherwise specifically noted, articles depicted in the drawings are not necessarily drawn to scale.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

Although specific advantages have been enumerated above, various embodiments may include some, none, or all of the enumerated advantages. Additionally, other technical advantages may become readily apparent to one of ordinary skill in the art after review of the foregoing figures and description.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

What is claimed is:

1. An information handling system comprising:
   a processor;
   a proximity sensor configured to determine whether a user of the information handling system is proximate to the information handling system;
   an air mover configured to cool one or more components of the information handling system; and
   an air mover control system configured to:
      receive an indication of user-selected acoustic parameters;
      receive a signal from the proximity sensor indicative of whether the user is proximate to the information handling system;
      receive a signal indicative of whether the information handling system is being powered from an alternating current source;
      receive a signal indicative of whether a utilization of the processor is greater than a threshold utilization;
      receive a signal indicative of whether computationally intensive software is executing on the processor;
      receive a signal indicative of whether a temperature associated with the information handling system is greater than a threshold temperature;
      in response to the user not being proximate to the information handling system, the information handling system being powered from the alternating current source, the utilization of the processor being greater than the threshold utilization, the computationally intensive software executing on the processor, and the temperature being greater than the threshold temperature, control the speed of the air mover according to a maximum speed; and
      control the speed of the air mover according to the user-selected acoustic parameters otherwise.

2. The information handling system of claim 1, wherein the air mover control system is further configured to cause the motor to operate at a first speed if the user is proximate to the information handling system and operate the motor at a second speed if no user is proximate to the information handling system, wherein the second speed is greater in magnitude than the first speed.

3. The information handling system of claim 1, wherein the air mover control system is embodied within a management controller of the information handling system.

4. A method comprising:
   receiving an indication of user-selected acoustic parameters;
   receiving a signal from a proximity sensor indicative of whether a user is proximate to an information handling system;
   receiving a signal indicative of whether the information handling system is being powered from an alternating current source;
   receiving a signal indicative of whether a utilization of a processor of the information handling system is greater than a threshold utilization;
   receiving a signal indicative of whether computationally intensive software is executing on the processor;
   receiving a signal indicative of whether a temperature associated with the information handling system is greater than a threshold temperature;
   in response to the user not being proximate to the information handling system, the information handling system being powered from the alternating current source, the utilization of the processor being greater than the threshold utilization, the computationally intensive software executing on the processor, and the temperature being greater than the threshold temperature, controlling the speed of the air mover according to a maximum speed; and controlling the speed of the air mover according to the user-selected acoustic parameters otherwise.

5. The method of claim 4, further comprising causing the motor to operate at a first speed if the user is proximate to the information handling system and operate the motor at a second speed if no user is proximate to the information handling system, wherein the second speed is greater in magnitude than the first speed.

6. An article of manufacture, comprising:

a non-transitory computer readable medium; and computer-executable instructions carried on the computer readable medium, the instructions readable by a processor, the instructions, when read and executed, for causing the processor to:

receive an indication of user-selected acoustic parameters;

receive a signal from a proximity sensor indicative of whether a user is proximate to an information handling system;

receive a signal indicative of whether the information handling system is being powered from an alternating current source;

receive a signal indicative of whether a utilization of the processor is greater than a threshold utilization;

receive a signal indicative of whether computationally intensive software is executing on the processor;

receive a signal indicative of whether a temperature associated with the information handling system is greater than a threshold temperature;

in response to the user not being proximate to the information handling system, the information handling system being powered from the alternating current source, the utilization of the processor being greater than the threshold utilization, the computationally intensive software executing on the processor, and the temperature being greater than the threshold temperature, control the speed of the air mover according to a maximum speed; and control the speed of the air mover according to the user-selected acoustic parameters otherwise.

7. The article of claim 6, the instructions for further causing the processor to cause the motor to operate at a first speed if the user is proximate to the information handling system and operate the motor at a second speed if no user is proximate to the information handling system, wherein the second speed is greater in magnitude than the first speed.

* * * * *